United States Patent Office 2,748,081
Patented May 29, 1956

2,748,081

WATER-RESISTANT NON-SOAP GREASE CONTAINING ALKALINE AGENTS

Walter H. Peterson, Point Richmond, and Thurston Skei, Lafayette, Calif., assignors to Shell Development Company, Emeryville, Calif., a corporation of Delaware No Drawing. Application June 2, 1952,
Serial No. 291,336

10 Claims. (Cl. 252—28)

This invention relates to improved grease compositions. More particularly, it is concerned with greases containing as the principal gelling agent an inorganic colloid or a derivative thereof.

Greases broadly comprise two principal classes, namely, those gelled with soaps of high molecular weight carboxylic acids and a newer class wherein the gelling agent comprises inorganic colloidal materials or onium clays. Useful amorphous colloids comprise such substances as silica or alumina and typical onium clays are those having a high base-exchange capacity which have been reacted with a quaternary onium compound to form a hydrophobic onium clay complex. Another type of material useful for grease formation comprises the combination of a high base-exchange clay waterproofed by adsorption of hydrophobic soaps or other hydrophobic surface-active agents.

In the absence of hydrophobic surface-active agents either the amorphous gelling agents or gelling agents prepared from clays exhibit water-sensitivity which reduces the practical applications of greases made therefrom. In overcoming this shortcoming, greases have been prepared containing not only a lubricating oil and an inorganic gelling agent but also a cationic, ionic, or non-ionic surfactant providing the composition with water-resistant properties. While the presence of the hydrophobic surface-active agent appears to be essential for successful utilization of the grease, this third component constitutes the most expensive ingredient therein. The gelling agent and the lubricating oil are relatively inexpensive materials, but the surfactants must usually be present in amounts of at least about 30% by weight of the gelling agent and, hence, constitute a major cost item in the grease.

It is an object of the present invention to provide improved grease compositions. It is another object of this invention to provide greases having improved water-resistant properties. It is a further object of this invention to provide greases exhibiting high water-resistance but having a diminished requirement for hydrophobic surfactant. Other objects will become apparent during the following discussion.

Now, in accordance with the present invention, it has been found that greases gelled with inorganic colloids and containing a hydrophobic surfactant may be modified by the presence of between about 0.1% and 1.0% by weight of the grease of alkali metal salts and hydroxides exhibiting an alkaline reaction when in contact with water. The presence of the alkali metal salt has been found to materially reduce the proportion of hydrophobic surface-active agent which is required to provide the grease composition with suitable water-resistant properties. Preferably the proportion and identity of the salt is such as to provide the grease with sufficient potential alkalinity that when in contact with water the pH thereof is above about 9.5.

The alkali metal salts and hydroxides which may be employed for this purpose may be those of sodium, potassium or lithium including hydroxides, carbonates, bicarbonates, acid phosphates and borates. Typical species coming within these classifications are as follows:

Hydroxides: Sodium hydroxide, potassium hydroxide, lithium hydroxide.
Carbonates: Sodium carbonate, potassium carbonate, lithium carbonate.
Bicarbonates: Sodium bicarbonate, potassium bicarbonate, lithium bicarbonate.
Hydrogen phosphates: Sodium dihydrogen phosphate, disodium hydrogen phosphate, potassium dihydrogen phosphate, dipotassium hydrogen phosphate, lithium dihydrogen phosphate, dilithium hydrogen phosphate.
Borates: Sodium borate, potassium borate, lithium borate.

The phenomena upon which the present invention depends have not been clearly elucidated. However, it has been determined by means of comparative testing that the presence of the subject alkali metals salts or hydroxides within the limits specified produces greases which exhibit superior lubricating characteristics with respect to bearing temperature, wear, corrosion and even noise. In addition, as pointed out above, the addition of these materials drastically reduces the requirement for hydrophobing agent for the maintenance of grease structure in the presence of water. The latter property is especially unaccountable, since it has been postulated previously that the hydrophobic character of the subject gelling agents is directly dependent upon the percentage of the gel surface which is coated with at least a monomolecular layer of the hydrophobic surface active agent.

When greases comprising a gelling agent such as silica, mineral lubricating oil and a waterproofing agent is utilized for the lubrication of a ball bearing assembly it has been found in many cases that undue wear occurs and that the bearing tends to heat up while in operation. The addition of an alkali metal hydroxide or salt (such as sodium bicarbonate) substantially reduces the temperature of the bearing during operation.

When the subject additives are not present, satisfactory resistance of the grease to the disintegrating influences of water is achieved only by the presence of an excessively large amount of waterproofing material, such as an amine or amino-amide. It has been noted that as the proportion of waterproofing agent to gelling agent becomes larger, a softening effect of the grease becomes more pronounced. Often it is necessary to use such a high proportion of waterproofing agent that the gelling agent content must be increased to counteract this softening action.

One of the unexpected results of adding the subject alkali metal alkaline agents to this class of greases is the substantial reduction in the requirement for high ratios of waterproofer to gelling agent. In certain instances it has been found that only half as much waterproofing agent was required, when a salt such as disodium acid phosphate was present, in order to maintain satisfactory water resistance. This not only eliminated softening of the grease but also reduced wear and improved other lubricating characteristics.

As noted hereinbefore, the waterproofing agents are by far the most costly ingredient used in the subject compositions. The material reduction in the requisite amount, caused by the addition of an alkali metal alkaline agent, is one of distinct economic importance and constitutes a major advantage of the present invention.

GREASE-FORMING GELS

The greases should contain from about 1% to about 20% of a grease-forming gel, based on weight of the total composition. These gels are in a highly porous form, having their normal water content replaced with a lubricating oil. As intimated hereinbefore, grease-forming gels are divided into two main classes. These include the amorphous substances and the crystalline materials capable of gel formation. Amorphous gels especially suited for use in this invention include especially the inorganic oxides, hydroxides, sulfides, sulfates, carbonates and phosphates. The most typical members having wide utility are silica; amphoteric metal oxides such as alumina; alkaline earth metal oxides and hydroxides including magnesia and lime; copper sulfide; calcium sulfate and manganese phosphate. These may be employed either as the single material or, more preferably, as mixtures thereof so as to obtain optimum combinations of properties peculiar to each species. For example, it has been found that greases gelled with silica are less effective for preventing corrosion than greases gelled with mixtures of magnesia and silica. In place of magnesia, silica may be mixed or co-precipitated with other polyvalent metal oxides capable of colloidal dispersion such as alumina and lime. Preferably, the amount of polyvalent metal oxide in admixture with silica is present in an amount greater than about 3% but less than about 40% based on the total weight of the inorganic microgel.

The second category of grease-forming materials contemplated for use in the compositions of this invention are those which in themselves are not usually capable of grease formation due to their low surface area and crystalline structure but which may be modified so as to provide them with suitable grease-forming properties. This class includes especially natural and synthetic clay-like substances which are modified by reaction with a cationic hydrophobic agent or by having a hydrophobic surface-active agent adsorbed on the swollen clay.

The clays which are useful as starting materials in accordance with this invention are those exhibiting substantial base-exchange properties and particularly those exhibiting comparatively high base-exchange properties and containing cations capable of relatively easy replacement. These clays (particularly contemplated by the specification and the claims) include the montmorillonites such as sodium, potassium, lithium and other bentonite, including Wyoming bentonite, magnesium bentonites, Hectorite and saponite: Attapulgite; zeolites and fuller's earths, particularly those of the Georgia-Florida type. These clays are characterized by an unbalanced atomic structure or unbalanced crystal lattice and are believed to have negative charges which are normally neutralized by inorganic cations. As found in nature, therefore, they exist as salts of the weak clay acid with bases such as the alkali or alkaline earth metal hydroxides.

The base-exchange capacities of the various clays enumerated run from about 15 to about 100 milliequivalents of exchangeable base per 100 grams of clay. The montmorillonites have comparatively high base-exchange capacity, usually between 60 and 100. Generally, the clays of higher base-exchange capacity (above about 25) are particularly useful where high exchange or adsorption of an organic base is desired.

As stated hereinbefore, these clays may be converted to grease-forming materials by ion-exchange with a hydrophobic cationic surface-active material or by the adsorption of hydrophobic surface-active agents. If ion-exchange is desired, it is preferable to disperse the clay in water and thereafter treat it with a quaternary ammonium salt bearing at least one hydrophobic hydrocarbon radical having at least 10 carbon atoms in a substantially straight aliphatic chain. In addition to using quaternary ammonium compounds, salts of amines may be utilized for the preparation of onium clays. Further, the analogs and homologs of said amines and quaternary ammonium compounds may be used of which the following are typical: triphenyl alkyl phosphonium, arsonium, stibonium halides; dialkyl or allyl sulfonium and silane onium halides, and pyrones such as 2,5-dialkylgamma-pyrone isochloride. The cationic surface-active materials useful for ion-exchange with or adsorption on the gelling agents of the present greases will be discussed in greater detail in the following section. Preferably the grease forming gels have bulk densities between about 0.025 and about 0.5 g. per cc. and particle sizes between about 0.1 to about 5 microns.

LUBRICATING OIL BASES

The oleaginous fluid vehicles useful in the formation of the greases of this invention include both natural and synthetic lubricants.

The base lubricant for forming greases by the process of this invention may be selected from a wide variety of natural and synthetic oils. Mineral oils of wide viscosity range varying from about 50 to 2,000 SUS at 100° F. and having a viscosity index of from below zero to about 80 can be used as well as their mixtures. A preferred mineral oil base may be prepared by redistilling a lubricating oil over caustic soda, extracting the distillate with furfural, nitrobenzene, phenol, etc., and refining the raffinate with a suitable adsorbent material to give an oil having the following properties:

Specific gravity at 60° F _____ 0.861
Flash point, ° F _____ 275
Pour point, ° F _____ —70
Final B. P., ° C. (ASTM) _____ 370

| | S. G. Oil (60° F.) | Flash Point Closed (°F.) | Viscosity Red I (secs.) | | K. V. I. | Pour Point, °F | Leendertse Type Analysis | | |
|---|---|---|---|---|---|---|---|---|---|
| | | | 140° F. | 70° F. | | | Aromatics | Paraffins | Naphthenes |
| A | 0.861 | 275 | | 61 | 64 | Minus 70 | 2 | 50.5 | 47.5 |
| B | 0.828 | 275 | | 44 | | 25 | 6 | 67 | 27 |
| C | 0.867 | 300 | 45 | | 55 | Minus 40 | 1 | 50 | 49 |
| D | 0.934 | 370 | 95 | | 10 | Minus 20 | 18.6 | 50.5 | 30.9 |
| E | 0.904 | 410 | 168 | | 46 | Minus 15 | 10 | 53 | 37 |

Mixtures of mineral oil and fixed oils such as castor oil, lard oil, and the like, can be used as well as organic synthetic lubricants and mixtures thereof such as:

I. Synthetic lubricants produced by the Fischer-Tropsch, Synthol, Synthine and related processes, e. g.:
  A. Polymerization of olefins such as ethylene, butylene, and the like, and their mixtures in presence of a Friedel-Crafts or other type condensation catalyst under elevated temperatures and pressures.
  B. Polymerization of unsaturated hydrocarbons in presence of a catalyst and then condensing said polymerized product with an aromatic hydrocarbon such as xylol, benzol, naphthalene, etc.
  C. Oxidation of polymerized olefins of lubricating range as noted under A and B.
  D. Process of converting natural gas to carbon monoxide and hydrogen, followed by catalytic reaction under elevated temperature and pressure to produce hydrocarbons and lubricating range (Synthol process).

II. Synthetic lubricating products produced by the Bergius process, e. g., by:
   A. Hydrogenation of coal, peat and related carbonaceous materials under pressure and elevated temperature in presence of a catalyst.
   B. Hydrogenation of asphalts, petroleum residues and the like.
III. Synthetic lubricants produced by the voltolization process, e. g., by:
   A. Voltolization of fatty materials such as fatty oils.
   B. Voltolization of mixtures of fatty oils and petroleum hydrocarbons.
   C. Voltolization of unsaturated hydrocarbons, their mixtures, and the like.
IV. Organic synthetic lubricants:
   A. Alkyl esters of organic acids, e. g.:
      Alkyl lactates
      Alkyl oxalates
      Alkyl sebacates (2-ethylhexyl sebacate)
      Alkyl adipates
      Alkyl phthalates (dioctyl phthalates)
      Alkyl ricinoleates (ethyl ricinoleate)
      Alkyl benzoates
   B. Alkyl, alkylaryl esters of inorganic acids, e. g., such as the phosphorus esters.

This particularly desirable class of oleaginous bases for the present compositions comprises organic phosphorus esters including phosphates, phosphonates, phosphinates, as well as the corresponding oxides. Typical species include:

Tricresyl phosphate
Trioctyl phosphate
Tributyl phosphate
Bis(3,5,5 - trimethylhexyl) - 2,4,4 - trimethylpentene phosphonate
Tris(3,5,5-trimethylhexyl)phosphate
N-heptenyl bis(3-butylpentane)phosphinate
Bis(3,5,5-trimethylhexane)octane phosphine oxide Another highly desirable type of phosphorus lubricants includes the diphosphorus compounds including the four classes referred to above. Preferably, the diphosrus compounds have a configuration as follows:

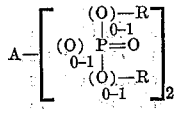

wherein A is an organic radical preferably aliphatic or aromatic hydrocarbon radical or alternatively an oxahydrocarbon radical or the corresponding sulfur, selenium or tellurium containing hydrocarbon radicals preferably saturated aliphatic hydrocarbon radicals having from 4 to 12 carbon atoms. The above configuration contemplates diphosphates, diphosphonates, diphosphinates, and diphosphine oxides. A particularly desirable configuration comprises those diphosphates having the following configuration:

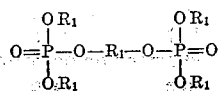

wherein each $R_1$ is an aliphatic hydrocarbon radical having from 2 to 6 carbon atoms. It has been found that lubricants of this particular configuration possess unexpectedly extreme low temperature operating characteristics. Species of such lubricants include:

1,4-butanediol bis(dibutyl phosphate)
1,3-propanediol bis(diamyl phosphate)

V. Synthetic lubricants made by polymerization of alkylene oxides and glycols at elevated temperatures in the presence of catalysts such as iodine, hydriodic acid, etc.:
   A. Polymers of alkylene glycol:
      Trimethylene glycol
      Propylene glycol
      Tetramethylene glycol
      Hexamethylene glycol
      Pentamethylene glycol
   B. Copolymers of:
      Trimethylene glycol and triethylene glycol
      Trimethylene glycol and hexamethylene glycol
      Trimethylene glycol and beta-methyltrimethylene glycol
      Trimethylene glycol and diethylene glycol
   C. Copolymers prepared from certain epoxides at elevated temperatures and in presence of KOH or $BF_3$-ether catalyst, e. g.:
      Eethylene oxide and propylene oxide
      Isobutylene oxide and propylene oxide
      Epichlorohydrin and propylene oxide
   D. Sulfur containing polymers obtained by treating allyl alcohol, divinyl ether, diallyl ether, diallyl sulfide, dimethallyl ether, glycols, with $H_2S$ in presence of a catalyst such as toluene sulfonic acid, peroxides, ultraviolet light, e. g.:
      Dihydroxy diethyl sulfide
      Dihydroxy dipropyl sulfide
      Trimethylene glycol and dihydroxy dipropyl sulfide
      Trimethylene glycol and dihydroxy diethyl sulfide
VI. Polymers obtained from oxygen-containing heterocyclic compounds, e. g., polymerization of tetrahydrofuran in the presence of a catalyst.
VII. Silicon polymers, e. g.:
      Polyalkyl siloxane and silicate polymers
      Alkylaryl siloxane and silicate polymers
      Dimethyl siloxane and silicate polymers, etc.
VIII. Halogenated aromatics may be used, especially when high temperature operations are required. These include chlorinated phenyls such as mono- and dichlorodiphenyl, trichlorodiphenyl, chlorinated terphenyls and higher molecular weight analogs thereof.

HYDROPHOBING AGENTS

The gelling agents should be waterproofed by the presence of 25–100% by weight thereof of a non-acidic hydrophobing substance, and preferably between 35 and 65% by weight.

The materials useful for the primary object of providing water resistance to the subject greases are those bearing hydrophobic radicals and preferably include amines and ammonium compounds as well as isologs of the ammonium group including phosphonium, arsonium, stibonium, oxonium and sulfonium compounds. More particularly, the preferred class of agents for providing optimum water resistance of these greases includes aliphatic amines and, still more preferably, aliphatic hydroxy amines containing at least 3 hydroxyl and amino groups, as long as they are hydrophobic derivatives. The amines may be simple aliphatic hydrocarbon amines, such as octadecylamine or other amines having from 8 to 36 carbon atoms. Typical of these are dodecylamine and hexadecylamine.

While these substances are hydrophobic without modification, even better results have been obtained by utilizing amines bearing a plurality of nitrogen atoms and, hence, a higher proportion of nitrogen to carbon content. Preferably, these polyamines contain at least one hydroxyl substituent and are converted to hydrophobic substances by partial amide formation with a hydrophobic anionic substance.

More specifically, the substances herein described include particularly the partial amides of polyhydroxyalkylene polyamines of which the partial amide of the condensation product of epichlorohydrin and ammonia is typical. The following is a representative preparation: Epichlorohydrin is added dropwise, or at least in small incremental proportions, to concentrated aqueous or alcoholic ammonia at a temperature between about 20° C. and 60° C.

The time of addition and the subsequent period of heating may be from about 10 minutes to about 4 hours or more. It has been found that a period of 20–40 minutes for the incorporation of the ingredients followed by ½–4 hours of heating usually results in substantially complete reaction. The reaction components after admixture are heated to a temperature between about 100 and about 170° C. until the reaction product has been dehydrated and condensed to the desired extent. The condensation product thus obtained is a somewhat water-soluble crystalline material which changes to a tacky fluid mass when heated above about 130–150° C. It is soluble to some extent in oil, indicating at least a partial oleophilic character. This substance is believed to be a mixture of monomer, dimer, trimer and polymers wherein the dimer is believed to have the configuration:

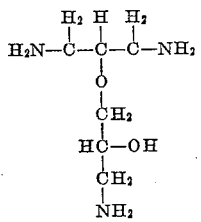

Subsequent to the condensation as described, the product is converted to a hydrophobic surface-active agent by conversion to an amide, such as by heating with tall oil or other hydrophobic anionic material at a temperature from about 150 to about 225° C. for a period from about 15 minutes to about 2 hours. For optimum characteristics in all respects, it is preferred that between about ⅓ and ⅔ of the amino groups present in the condensation mixture be converted to the amide form. It has been found that these partial amides (especially having the defined ratios of amide and amino groups) exhibit optimum hydrophobic and surface-active characteristics.

In place of epichlorohydrin, it is evident that other reactants may be employed such as the general class of monohaloepoxyalkanes, monohalodihydroxyalkanes and dihalohydrins. Typical species are 2,3-epoxy-4-chlorobutene, 2-chloro-1,3-dihydroxypropane, 1,2-dichloro-3-hydroxypropane, 1,2-dichloro-3-propanol, 1,3-dichloro-2-propanol, 2-chloro-1,3-dipropanol and 1-chloro-2,3-dipropanol. The corresponding partial amides of polyalkylene polyamines are also effective waterproofing agents. For example, the half-amide of oleic acid and ethylenediamine is suitable. Further amides of this type which are suitable include the partial amides of ethylenediamine, propylenediamine, diethylene triamine and triethylene tetramine with such acids as tall oil, rosin, oleic acid and naphthenic acid.

Quaternary compounds which are suitable either for reaction with or addition to the gel-forming materials include triphenyl lauryl phosphonium bromide, didodecyl ethyl sulfonium bromide, decyl triphenyl arsonium chloride, decyl triphenyl stibonium iodide, dodecyl ammonium acetate, dimethyl dicetyl ammonium bromide and their homologs and analogs.

While free amines may be utilized as the source of hydrophobic cations, this is not essential since other sources are available and at times are preferred. Thus, salts and amides thereof may also be used. Especially preferred among this class are the salts of the above enumerated amines with high molecular weight acids. Typical among these are the amine salts of the epichlorohydrin-ammonia condensation product with oleic acid. Other suitable salts include the salts of diamyl amine and stearic acid, dibutyl amine and tall oil acids, as well as other salts of amines or polyamines, hydroxy amines or hydroxy polyamines with fatty acids, sulfonic acids, dicarboxylic acids or phosphonic acids, each of which is capable of yielding a hydrophobic anion when in contact with water.

Typical soaps which are suitable for use in the present compositions include especially polyvalent metal soaps of fatty acids and, more particularly, amphoteric metal soaps thereof. These include primarily lead stearate, aluminum oleate and the corresponding soaps of copper, cobalt, calcium and barium.

GREASE COMPOSITIONS

The greases of the present invention may be prepared by several alternative means mainly dependent upon whether the hydrophobing agent is adsorbed on or reacted with the microgel. In the case of the amorphous gelling agents, it is normal practice to prepare greases wherein the hydrophobic surface-active agent is adsorbed on the gel surface. Clay greases may be prepared in a similar fashion. Under these circumstances, the preferred initial step comprises forming a hydrogel of the inorganic material. The hydrogel is washed to remove soluble salts such as sodium chloride, after which the hydrogel is treated with the surface-active agent mixed with lubricating oil preferably containing the anionic surface-active material. The ingredients are subjected to a milling procedure to form a highly dispersed system of the hydrogel in the oil phase. This mixture is then subjected to dehydration and subsequently is finished by further milling or other colloiding procedure so as to produce a suitable grease structure.

The steps involved in the preparation of greases gelled with onium-clays are substantially the same except as follows: the clay is dispersed in water and treated with a hydrophobing amount of a quaternary compound such as dimethyl dicetyl ammonium bromide. From this point on the procedure is substantially identical with that already described.

Another means for the preparation of the present greases comprises the introduction of a drying step subsequent to gel formation but prior to introduction of oil. Utilizing this procedure in the case of the amorphous gels, two alternative steps may be taken. In the first place, the gel may be dehydrated by displacement of water with a volatile liquid such as acetone or methyl alcohol. This in turn may be displaced by addition of oil and subsequent distillation to remove the organic solvent. Alternatively, the solvent-wet gel may be converted to the aerogel form by heating the solvent-wet gel in an autoclave under pressure to a temperature above the critical temperature of the solvent present. Above this point, the solvent is flashed off leaving the amorphous gel in a highly expanded form suitable for grease formation.

Still further means for the preparation of greases comprising the ingredients described hereinbefore depends upon spray drying of hydrogels of the inorganic gelling agent in the presence of at least a substantial fraction (or all) of the hydrophobic surfactant. Preferably, this spray drying is conducted after homogenizing the hydrogel and surfactant to provide a uniform dispersion often resembling a cream or soft salve. Upon spray drying such material at elevated temperatures in the order of from 80° C. to 500° C., it has been found that the ultimate particle diameter is sufficiently fine and the bulk density sufficiently low so that the product may be employed for grease formation simply by stirring into a lubricating oil and milling the mixture. It will be recognized that the latter process is especially desirable since it may be conducted in standard plant equipment previously utilized for ordinary soap grease formation. The water-soluble alkali metal alkaline derivatives may be added at any point during these grease preparation procedures but it is preferred that addition be made after the last point at which water is separated from any of the grease ingredients or mixtures.

As pointed out hereinbefore, one of the principal advantages obtained by the use of these alkaline metal compounds comprises the substantial reduction experienced in the requirement for hydrophobic surface-active agent. This reduction may be made without adversely affecting the water-resistant character of the greases. The following examples illustrate the advantages gained by the present invention:

*Example I*

A grease was prepared by milling 1 part by weight of silica aerogel and 9 parts by weight of mineral lubricating oil until a grease structure was formed. A tall oil amide of the condensation product of epichlorohydrin and ammonia was present as a waterproofant. It was necessary to use 0.4 part by weight of the waterproofant in order to obtain satisfactory lubricating results in a motor bearing rig in the presence of moisture. When 0.1 part by weight of disodium acid phosphate was added to the silica-oil grease, the waterproofant requirement for equal performance was reduced to 0.2 part. Moreover, the bearing ran at a temperature approximately 20–30° C. below that encountered when the phosphate is absent. Similar advantages can be obtained by the use of 0.5 part sodium bicarbonate, 0.2 part of sodium hydroxide, 0.25 part lithium borate or 0.5 part potassium carbonate. The quality of lubrication is judged on an over-all performance, including wear, temperature, noise and bearing appearance.

*Example II*

Eight parts of a copolymer of 1:1 molar ratio of ethylene oxide and propylene oxide having an average molecular weight of 900 can be milled with 0.6 part silica aerogel to form a grease structure. The silica may be waterproofed with a substantially monomolecular film of stearylamine, e. g., 0.4 part by weight, but the grease so produced exhibits wear characteristics in a bearing and in the presence of water does not provide proper lubrication after about 6 hours at 90° C. The addition of 0.1 part sodium borate reduces the amine requirement by about 40% and increases the bearing life about 500%.

We claim as our invention:

1. A grease composition comprising the following ingredients in the stated proportions:

| | Per cent by weight |
|---|---|
| Silica gel having a bulk density of 0.025 to 0.5 g. per cc | 1–20 |
| Alkali metal carbonate | 0.1–1.0 |
| Cationic hydrophobic surface-active agent. | 25–100% based on the gel. |
| Mineral lubricating oil | Balance | said gel being capable of forming a grease with the lubricating oil.

2. A grease composition comprising the following ingredients in the stated proportions:

| | Per cent by weight |
|---|---|
| Silica gel having a bulk density of 0.025 to 0.5 g. per cc | 1–20 |
| Alkali metal bicarbonate | 0.1–1.0 |
| Cationic hydrophobic surface-active agent. | 25–100% based on the gel. |
| Mineral lubricating oil | Balance | said gel being capable of forming a grease with the lubricating oil.

3. A grease composition comprising the following ingredients in the stated proportions:

| | Per cent by weight |
|---|---|
| Silica gel having a bulk density of 0.025 to 0.5 g. per cc | 1–20 |
| Alkali metal hydrogen phosphate | 0.1–1.0 |
| Cationic hydrophobic surface-active agent. | 25–100% based on the gel. |
| Mineral lubricating oil | Balance | said gel being capable of forming a grease with the lubricating oil.

4. A grease composition comprising the following ingredients in the stated proportions:

| | Per cent by weight |
|---|---|
| Grease-forming silica gel having a particle size diameter from 0.1 micron to 5 microns | 1–20 |
| Alkali metal hydroxide | 0.1–1 |
| Cationic hydrophobic surface-active agent. | 25–100% based on the gel. |
| Mineral lubricating oil | Balance |

5. A grease composition comprising the following ingredients in the stated proportions:

| | Per cent by weight |
|---|---|
| Grease-forming silica gel having a bulk density of 0.025 to 0.5 g. per cc | 1–20 |
| Sodium carbonate | 0.1–1.0 |
| Cationic hydrophobic surface-active agent. | 25–100% based on the gel. |
| Mineral lubricating oil | Balance |

6. A grease composition comprising the following ingredients in the stated proportions:

| | Per cent by weight |
|---|---|
| Grease-forming silica gel having a bulk density of 0.025 to 0.5 g. per cc | 1–20 |
| Sodium bicarbonate | 0.1–1.0 |
| Cationic hydrophobic surface-active agent | 25–100% based on the gel. |
| Mineral lubricating oil | Balance |

7. A grease composition comprising the following ingredients in the stated proportions:

| | Per cent by weight |
|---|---|
| Grease-forming silica gel having a bulk density of 0.025 to 0.5 g. per cc | 1–20 |
| Sodium dihydrogen phosphate | 0.1–1.0 |
| Cationic hydrophobic surface-active agent. | 25–100% based on the gel. |
| Mineral lubricating oil | Balance |

8. A grease composition comprising the following ingredients in the stated proportions:

| | Per cent by weight |
|---|---|
| Grease-forming silica gel having a bulk density of 0.025 to 0.5 g. per cc | 10 |
| Sodium bicarbonate | 0.5 |
| Partial amide formed between tall oil acids and the condensation product of epichlorohydrin and ammonia | 2 |
| Mineral lubricating oil | 87.5 |

9. A grease composition comprising a water-insoluble lubricating oil having dispersed therein an inorganic grease-forming silicate gel having its normal water content replaced by the lubricating oil and having adsorbed on the surfaces thereof between about 25% and about 100% by weight of the gel of a hydrophobic cationic surface-active agent, and an inorganic water-soluble alkali metal alkaline agent in an amount between about 0.1% and 1% by weight of said grease, said alkaline agent, when dissolved in water, causing the pH thereof to be above 9.5.

10. A grease composition comprising a water-insoluble lubricating oil having dispersed therein an inorganic grease-forming gel of the group consisting of silicate gels and silica gels, said gels having their normal water content replaced by the lubricating oil and having adsorbed on the surfaces thereof between about 25% and about 100% by weight of the gel of a cationic hydrophobic surface-active agent, and an inorganic water-soluble alkali metal alkaline agent in an amount between about 0.1% and about 1% by weight of said grease, said alkaline agent when dissolved in water causing the pH thereof to be above 9.5.

References Cited in the file of this patent

UNITED STATES PATENTS

| | | |
|---|---|---|
| 2,079,051 | Sullivan et al. | Mar. 15, 1933 |
| 2,398,075 | Brunstrum et al. | Apr. 9, 1946 |
| 2,430,400 | Hoelscher | Nov. 4, 1947 |
| 2,514,331 | Morway | July 4, 1950 |
| 2,607,735 | Sproule et al. | Aug. 19, 1952 |
| 2,614,986 | Beerbower et al. | Oct. 21, 1952 |
| 2,648,633 | Peterson et al. | Aug. 11, 1953 |